3,658,932
ISOMERIZATION OF 4-METHYLPENTENE-1
Robert P. Arganbright and Mervin M. Simpson, Jr., Houston, Tex., assignors to Petro-Tex Chemical Corporation, Houston, Tex.
No Drawing. Filed Sept. 29, 1969, Ser. No. 862,003
Int. Cl. C07c 5/22
U.S. Cl. 260—683.2
4 Claims

ABSTRACT OF THE DISCLOSURE 4-methylpentene-1 can be isomerized in good yields to 4-methylpentene-2 using a molecular sieve catalyst having a pore size of 4 A. For example, type 13X gave 65.6 percent yield of 4–MP–2. The selectivity of the catalysts can be improved by substituting a noble metal ion for a portion of the sodium in the catalyst, e.g. yields go to 73.5 percent. This result is contrary to the thermodynamic equilibrium which indicates the predominant product is 2-methylpentene-2 and 4–MP–2 is only a minor product. 4–MP–2 can be reacted with ethylene over a 10 percent $MoO_3$-alumina catalyst to give good yields of 3-methylbutene-1 which can be dehydrogenated to isoprene.

---

This invention relates to the preparation of 4-methylpentene-2 by the isomerization of 4-methylpentene-1 using a molecular sieve catalyst, more particularly a molecular sieve having a pore size of greater than 4 Angstroms.

Molecular sieves have been employed as isomerization catalyst for n-paraffins in petroleum refining. Although some activity would be expected from 4-methylpentene-1 contacted with a molecular sieve the nature of that activity (isomerism, cracking, dehydrogenation, etc.) could not necessarily be predicted beforehand. If it were predictable that 4-methylpentene-1 would isomerize, it would be expected that the result would be the thermodynamic equilibrium mixture of isomers. Within the isomerization temperature range, even within the operable range of molecular sieves the thermodynamic equilibrium predicts that the substantial predominant isomer, will be 2-methylpentene-2. It has been found quite surprisingly and contrary to the predictable result that the substantial major isomer using a molecular sieve catalyst is 4-methylpentene-2.

Briefly stated, the present invention is a process for the preparation of 4-methylpentene-2 comprising contacting 4-methylpentene-1 with a catalyst comprising a molecular sieve having a pore size of greater than 4 angstroms.

The central feature of the present invention is the use of a molecular sieve catalyst. Molecular sieves are porous crystalline, three-dimensional metal alumina-silicates of the zeolite mineral group. The crystal skeleton is composed of silicon and aluminum atoms each surrounded by four oxygen atoms to form a small pyramid or tetrahedron (tetrahedral coordination). The term molecular sieve can be applied to both naturally occurring zeolites and synthetic zeolites. Naturally occurring zeolites have irregular pore size and are not generally considered as equivalent to synthetic zeolites. In the present invention, however, naturally occurring zeolites are acceptable so long as they are substantially pure and have substantially all of their pores of greater than 4 angstroms size. The balance of the present discussion shall be directed to the synthetic zeolites with the understanding that natural zeolites are considered equivalent thereto as indicated above, i.e. in so far as the natural zeolites are the functional equivalents of the synthetic zeolites.

Usually synthetic zeolites are prepared in the sodium form, that is, with a sodium cation in close proximity to each aluminum tetrahedron and balancing its charge. To date four principal types of molecular sieves have been reported, A, X, Y and L. The A type have relative small pore size. By the term pore size is meant the effective pore size (diameter) rather than the free pore size (diameter). Type 5A having an effective pore size of approximately 5 A. (free diameter 4.2 A.) has been found suitable for the present process. Types X and Y have larger pore size (approximately 10 A.) and differ as to the range of ratio of $AlO_4$ to $SiO_4$ as:

Type X _____ $NaO \cdot Al_2O_3 \cdot 2.0$–$3.0$ $SiO_2$
Type Y _____ $NaO \cdot Al_2O_3 \cdot 3.0$–$6.0$ $SiO_2$ Type L has still higher ratios of $SiO_2$ to $Al_2O_3$.

It would appear that the pore size within the crystal lattice is important to the present reaction only in so far as the pore size is sufficiently large to allow the reactant molecules to pass through. According to one theory of molecular sieve catalytic activity, zeolite catalysis occurs primarily inside the uniform crystal cavities, consequently zeolitic catalyst activity depends on the number of aluminum atoms in the crystal and thus on the chemical composition of the crystal. Moreover, these catalytic sites are fixed within the rigid structure of the crystal, so that access to sites can be altered by altering the structure of the crystal.

In a preferred embodiment of the present invention the molecular sieve is modified by the substitution of a metal comprising a member selected from the group consisting of a noble metal of group VIII of the Periodic Table * for a portion of the sodium associated with aluminum in the crystals. The noble metals or platinum metals as they are often called are Group VIII metals including platinum, palladium, iridium, ruthenium, rhodium and osmium. One theory proposes that the substitution of a multivalent metal ion for the sodium ions of the aluminum-containing tetrahedra results in "carboniogenic" centers. These multivalent metal ions each displace two or more sodium ions from as many tetrahedra. The multivalent ion tends, however, to settle near one of these tetrahedra resulting in areas of surplus charge or carboniogenic centers, which exist as electric fields surrounding the multivalent cations. These fields have a strong polarizing influence which cause the carbon-hydrogen bonds to stretch or polarize. This theory does not require an actual cleavage of H-ion to form a full carbonium ion. The theories presented above may or may not be correct and no reliance is placed thereon for the operation of the present process nor are they in any way to be regarded as limitations on the invention or the claims thereto.

The metal cations can be introduced into the molecular sieves by contacting an aqueous solution of a soluble salt of the metal with the molecular sieve. This can be done by passing an aqueous solution of the metal salt through a bed of molecular sieve, e.g. in a reactor column or by adding a solution metal salt to a stirred aqueous slurry of molecular sieve. The quantity of metal salt employed can be calculated to yield the desired concentration of metal in the finished catalyst. For concentration up to several weight percent the exchange can be essentially quantitative.

The chloride salts, amine complex salts, and such are suitable, for example, palladium chloride, platinum trichloride, ruthenium tetrachloride, rhodium trichloride, osmium trichloride, iridium dichloride, tetramine platinum (II) chloride, tetramine palladium (II) chloride and the like. In addition there are other suitable salts and complexes that can be employed, for example, palladium selenate, ruthenium oxide and rhodium nitrate. Prior to

---

*Handbook of Chemistry and Physics, 45th ed., 1964–1965, The Chemical Rubber Co., Cleveland, Ohio, p. B–2.

use the substituted catalyst is conventionally heated to a temperature in the range of 300–600° C. for 1 to 8 hours in the presence of a reducing gas such as hydrogen or propylene.

Small quantities of noble metal substituted in the molecular sieve greatly increase the catalytic effect of the sieve. For a practical operation, however, there will be .05 weight percent of the metal or more preferably about .1 weight percent. Although the optimum results will vary with each of the metals specified the metal will be employed in the range of about .05 to .8 weight percent. The catalysts, however, may contain larger amounts of the specified metals, for example up to 5 weight percent. Weight percent refers to the finished catalyst.

The 4-methylpentene-1 used as the reactant is employed in as pure a state as possible in order to maximize yield and reduce by-products. Very high purity 4-methylpentene-1 can be prepared by the dimerization of propylene or can be obtained commercially. U.S. Pats. 2,986,588 and 3,175,020 relate to improved methods of 4–MP–1 synthesis.

In carrying out the present process 4-methylpentene-1 is usually charged to the top of reactor column packed with molecular sieve catalyst which has been purged with nitrogen or other inert gas prior to use. The reaction can also be carried out batchwise, for example, in a vigorously stirred autoclave. In the continuous process a convenient method of measuring olefin addition is in terms of liquid hourly space velocity (LHSV) which measures the volume of feed material which contacts unit volume of catalyst per hour and is in units of reciprocal hours (hours–1). Typically LHSV of 0.1 to 1.0 is employed. The temperature of reaction employed varies particularly in regard to the substituted metal ion, but is generally above room temperature (25° C.) to 250° C. Higher temperatures can be employed up to the point where there is substantially dehydrogenation rather than isomerization occurring. The reaction proceeds well at atmospheric pressure but sub- or superatmospheric pressures of from about .5 to 150 atmospheres can be used.

The product, 4-methylpentene-2, which is recovered

The variation using two different olefin molecules is shown in Netherlands patent application 6,514,985 published May 20, 1966. Typical dismutation catalysts are $MoO_3$, $WO_3$ and $Re_2O_7$ which are deposited on a suitable high surface area inert support such as alumina or silica-alumina preferably at least 75 percent alumina in amounts of from .5 to 30 weight percent. The dismutations are carried out at dismutation temperatures of 25–400° C. depending largely on the catalyst, i.e. $Re_2O_7$— 25–80° C., $MoO_3$—70 to 150° C., $WO_3$—200–400° C., approximately at atmospheric up to 150 atmospheres and weight hourly space velocities (WHSV) of .01 hr.$^{-1}$ to 40 hr.$^{-1}$. The following examples are presented to further illustrate the invention:

EXAMPLES 1–6

A series of runs were made using molecular sieve catalysts. The catalysts are all commercially available. These particular catalysts (1–5) are products of Union Carbide Corp. Linde Division. Type 3A has a nominal pore size or 3 A., Type 4A has 4 A., Type 5 has 5 A., 10X has 8 A. and 13X has 10 A. Example 6 shows a run made with a palladium substituted 13X molecular sieve. The molecular sieve contains 1.3 weight percent palladium and was prepared by treating 50 ml. of Linde 13X molecular sieves for 30 minutes with 100 ml. of 1 percent solution of palladium nitrate in water. The treated sieves were washed three times with 100 ml. portions of distilled water and then were dried to 138° C. under a nitrogen purge. The feed in each run was 100 percent 4-methylpentene-1.

The runs were made in a 1" x 16" tubular pyrex reactor at atmospheric pressure. The conditions and results are set out in Table I. The thermodynamic equilibrium for the reaction is set out in the table also at both 150° C. and 138° C. It can be readily seen from the results that the product distribution of the examples according to the invention, 3–6, are completely unexpected from the equilibrium data. Analysis was by gas liquid phase chromatography (GLPC). The Pd substituted 13X catalyst (Ex. 6) gave the highest yield, i.e. 73.5%.

TABLE I

| | Example | | | | | | Thermodynamic equilibrium | |
|---|---|---|---|---|---|---|---|---|
| | 1 | 2 | 3 | 4 | 5 | 6 | | |
| | Catalyst | | | | | | | |
| | 3A | 4A | 5A | 10X | 13X | 13X [1] | 138° C. | 150° C. |
| Conditions: | | | | | | | | |
| Temp., ° C | 150 | 150 | 150 | 150 | 150 | 138 | | |
| LHSV | 0.133 | 0.133 | 0.133 | 0.133 | 0.133 | 0.4 | | |
| Products (wt. percent): | | | | | | | | |
| 4–MP–1 | 100 | 100 | 7.8 | 1.5 | 15.8 | 19.7 | 0.5 | 0.9 |
| 4–MP–2 | | | 41.9 | 66.1 | 65.6 | 73.5 | 13.9 | 14.7 |
| 2–MP–1 | | | 7.7 | 5.9 | 2.5 | 1.0 | 19.8 | 22.3 |
| 2–MP–2 | | | 37.6 | Trace | 14.6 | 5.7 | 65.8 | 62.1 |
| Oligomers | | | 4.8 | 26.5 | 1.3 | 0 | | |
| Conversion of 4–MP–1, percent | 0 | 0 | 92.2 | 98.5 | 84.2 | 80.3 | | |
| Selectivity to 4–MP–2, percent | | | 45.3 | 67.1 | 77.9 | 91.5 | | |
| Yield of 4–MP–2, percent (conv.Xsel.) | | | 41.7 | 66.1 | 65.9 | 73.5 | | |

[1] Palladium exchanged.

has a particular utility in that it undergoes a dismutation reaction with ethylene to produce a high yield of 3-methylbutene-1, an immediate precursor of isoprene which can be obtained by the oxidative dehydrogenation of 3–MB–1.

Dismutation which is often referred to as disproportionation is the reaction of olefinic molecules in the presence of metal containing catalysts, e.g. $MoO_3$ (10 percent) on alumina to produce an equal number of other olefinic molecules and is attributed to Robert L. Banks and Grant C. Bailey, I & EC, Product Research and Development, vol. 3, No. 3, September 1964, pp. 170–173.

The 4–MP–2 can be recovered and purified by fractional distillation, fractional crystallization or combinations thereof with other well known techniques to produce essentially 100 percent pure 4–MP–2.

EXAMPLES 7 and 8

This example shows the utilization of 4-methyl pentene-2 to prepare 3-methyl butene-1. The catalyst employed was $MoO_3$-alumina catalyst prepared in a vertical glass tubular reactor by impregnating dry commercial alumina ⅛" pellets (Alcoa H–151) with sufficient ammonium molybdate hydrate (in solution) to provide 10 weight percent MoO₃ on the support. The impregnated alumina was heated to 550° C. for about 2 hours under a flow of air. The catalyst was cooled to the reaction temperature, 95° C. and purged with nitrogen. The feed in Example 7 was 20 ml. (gas)/minute of an isomer mixture of 93 percent 4-methyl pentene-2 and 7 percent 4-methyl pentene-1 and 40 ml. (gas)/minute of ethylene. In Example 8 the feed was 20 ml. (gas)/minute of 100 percent 4-methyl pentene-2 and 40 ml. (gas)/minute of ethylene. The results are shown in Table II.

TABLE II

| Example | 7 | 8 |
|---|---|---|
| Product wt. percent:[1] | | |
| Ethylene | 29.7 | 23.9 |
| Propylene | 18.7 | 19.2 |
| n-Butenes | 3.1 | 4.1 |
| 3-methyl butene-1 | 24.8 | 26.8 |
| 2-methyl butene-1 | Trace | Trace |
| 2-methyl butene-2 | 4.1 | 2.6 |
| 4-methyl pentene-1 | 4.1 | |
| 4-methyl pentene-2 | 14.6 | 22.7 |
| 2-methyl pentene-2 | 0.6 | 0.4 |
| Conversion of 4-MP-2, percent | 73.8 | 62.2 |
| Selectivity to 3-MB-1, percent | 73.4 | 86.2 |
| Yield of 3-MB-1 | 54.2 | 53.6 |
| Selectivity to methyl butenes | 85.5 | 99.0 |

[1] GLPC.

The conversion of 3-methyl butene-1 to isoprene is easily accomplished by conventional dehydrogenation or oxidative dehydrogenations in near quantitative yields.

The invention claimed is:
1. A process for the preparation of 4-methyl pentene-2 comprising contacting 4-methyl pentene-1 with a catalyst consisting of molecular sieve having a pore size of greater than 4 A. containing 0.05 to 5 weight percent of a noble metal of Group VIII of the Periodic Table at a temperature in the range of about 25 to 250° C. and recovering 4-methyl pentene-2 as the predominant product.
2. The process according to claim 1 wherein the pore size is at least about 5 A.
3. The process according to claim 1 where there is .05 to .8 weight percent modifying metal.
4. The process according to claim 1 wherein the metal is palladium.

References Cited
UNITED STATES PATENTS

| 3,236,909 | 2/1966 | Winnick | 260—683.2 |
| 3,428,704 | 2/1969 | Fishel | 260—683.2 |
| 3,457,320 | 7/1969 | Stapp et al. | 260—683 |
| 3,526,676 | 9/1970 | Turner et al. | 260—683 |

DELBERT E. GANTZ, Primary Examiner

C. E. SPRESSER, JR., Assistant Examiner

U.S. Cl. X.R.
260—683 D